United States Patent
Koibuchi et al.

(10) Patent No.: US 10,012,202 B2
(45) Date of Patent: Jul. 3, 2018

(54) VEHICULAR ENGINE CONTROL DEVICE

(71) Applicant: HONDA MOTOR CO., LTD., Minato-ku, Tokyo (JP)

(72) Inventors: Hiroyuki Koibuchi, Wako (JP); Yoshitake Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 18 days.

(21) Appl. No.: 14/782,955

(22) PCT Filed: Apr. 3, 2014

(86) PCT No.: PCT/JP2014/059881
§ 371 (c)(1),
(2) Date: Oct. 7, 2015

(87) PCT Pub. No.: WO2014/168075
PCT Pub. Date: Oct. 16, 2014

(65) Prior Publication Data
US 2016/0069317 A1   Mar. 10, 2016

(30) Foreign Application Priority Data

Apr. 8, 2013  (JP) ................................ 2013-080310

(51) Int. Cl.
*F02N 11/00* (2006.01)
*F02N 11/08* (2006.01)
(Continued)

(52) U.S. Cl.
CPC ............ *F02N 11/084* (2013.01); *F02D 17/04* (2013.01); *F02D 29/02* (2013.01);
(Continued)

(58) Field of Classification Search
CPC ............... F02N 11/084; F02N 11/0833; F02N 2200/0808; F02D 17/04; F02D 29/02
See application file for complete search history.

(56) References Cited

U.S. PATENT DOCUMENTS

2011/0046864 A1* 2/2011 Kamiya ............. F02N 11/0833
                                                          701/102
2011/0082624 A1* 4/2011 Yamamoto ............. F02D 29/02
                                                          701/41
(Continued)

FOREIGN PATENT DOCUMENTS

JP   2005-337184 A   12/2005
JP   2011-202616 A   10/2011
(Continued)

*Primary Examiner* — Hieu T Vo
*Assistant Examiner* — Sherman Manley
(74) *Attorney, Agent, or Firm* — Carrier Blackman & Associates, P.C.; Joseph P. Carrier; Jeffrey T. Gedeon

(57) ABSTRACT

A vehicular engine control device provided with a control unit for performing control that automatically stops an engine installed in a vehicle when a preset stop condition is fulfilled, and a traveling information acquiring unit for acquiring travel information including vehicle speed information relating to the speed of the vehicle and steering information relating to a steering wheel. For the stop condition the vehicle speed information and steering information acquired by the traveling information acquiring unit are set including respective thresholds. The control unit switches the stop condition in accordance with changes in the vehicle speed information, the stop condition being sectioned into a plurality of regions using steering thresholds for the steering information relating to the steering handle. Automatic stop control of the engine conforming to the intentions of the driver can be implemented by the vehicular engine control device.

5 Claims, 7 Drawing Sheets

(51) Int. Cl.
*F02D 29/02* (2006.01)
*F02D 17/04* (2006.01)
(52) U.S. Cl.
CPC .. *F02N 11/0833* (2013.01); *F02N 2200/0801* (2013.01); *F02N 2200/0808* (2013.01); *Y02T 10/48* (2013.01)

(56) References Cited

U.S. PATENT DOCUMENTS

| | | | | |
|---|---|---|---|---|
| 2012/0318227 | A1* | 12/2012 | Hashimoto | F02N 11/0855 123/179.3 |
| 2012/0330529 | A1* | 12/2012 | Pebley | F02N 11/084 701/101 |
| 2013/0245925 | A1* | 9/2013 | Malone | F02N 11/0818 701/113 |
| 2016/0229403 | A1* | 8/2016 | Khafagy | B60W 30/18 |
| 2017/0074189 | A1* | 3/2017 | Oda | B60W 10/06 |

FOREIGN PATENT DOCUMENTS

| | | |
|---|---|---|
| JP | 2013-024147 A | 2/2013 |
| JP | 2013-053578 A | 3/2013 |
| WO | 2011/021305 A1 | 2/2011 |

\* cited by examiner

Output characteristic of vehicle speed sensor

Output characteristic of steering angle sensor

Output characteristic of steering torque sensor

On/off output characteristic of brake sensor

On/off output characteristic of engine

Output characteristic of vehicle speed sensor

Output characteristic of steering angle sensor

Output characteristic of steering torque sensor

On/off output characteristic of brake sensor

On/off output characteristic of engine

Output characteristic of vehicle speed sensor

Output characteristic of steering angle sensor

Output characteristic of steering torque sensor

On/off output characteristic of brake sensor

On/off output characteristic of engine

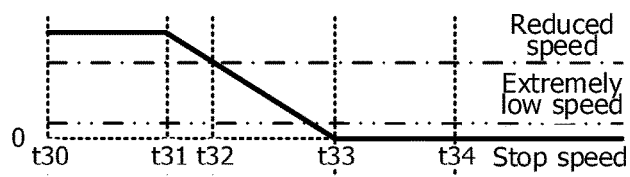
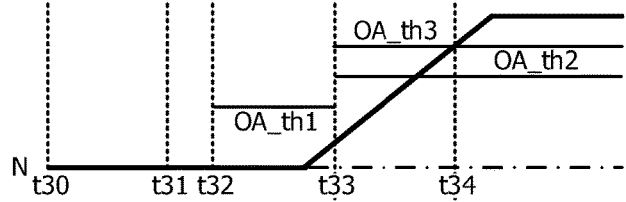
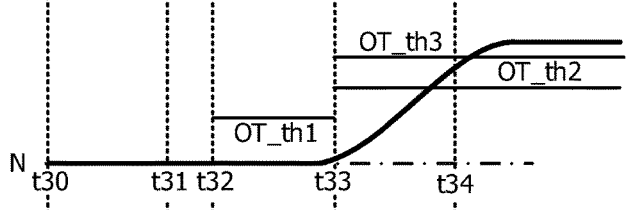
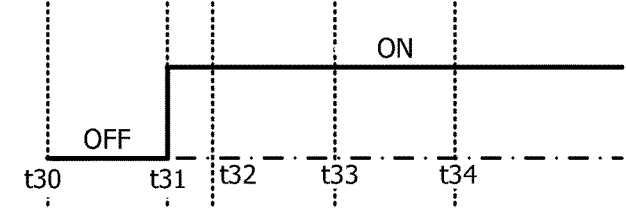
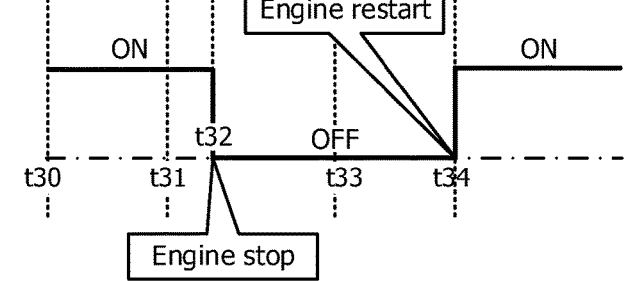

Output characteristic of vehicle speed sensor

Output characteristic of steering angle sensor

Output characteristic of steering torque sensor

On/off output characteristic of brake sensor

On/off output characteristic of engine

Output characteristic of vehicle speed sensor

Output characteristic of steering angle sensor

Output characteristic of steering torque sensor

On/off output characteristic of brake sensor

On/off output characteristic of engine

VEHICULAR ENGINE CONTROL DEVICE

TECHNICAL FIELD

The present invention relates to a vehicular engine control device including a control unit for controlling the engine installed on a vehicle to stop when a preset stop condition is fulfilled.

BACKGROUND ART

Conventionally, vehicular engine control devices are known which include a control unit for controlling a stop of an engine installed on a vehicle when a preset stop condition (for example, a braking operation is made when a vehicle speed is zero) is fulfilled to save fuel, decrease emission, and reduce noise.

As such an example of the vehicular engine control device, Patent Document 1 discloses an idling stop control device. The idling stop control device disclosed in Patent Document 1 operates such that idling stop of the engine is inhibited for a predetermined period when a stop inhibition condition that a steering speed of a steering wheel is equal to or higher than a predetermined speed is fulfilled.

According to the idling stop control device disclosed in Patent Document 1, an assistance force for operating the steering wheel can be secured because the stop of the engine, which relates to a power for assisting the steering operation, is avoided during operation of the steering.

PRIOR ART

Patent Document

Patent document 1: JP2011-202616 A

SUMMARY OF INVENTION

Problem to be Solved by Invention

However, there is no disclosure and no suggestion in the technology according to Patent document 1 about an automatic engine stop control performed with the vehicle speed associated with the steering operation. Accordingly, in the technology disclosed in Patent document 1, for example, though a driver tries to pass an intersection at an extremely low speed, the automatic engine stop control may be done against the driver's intention. Further, also in the case where the driver tries to park the vehicle at an extremely low speed, the automatic engine stop control may be done against the driver's intention as similarly to the above description.

The present invention is provided to solve the above problems and aims to provide a vehicular engine control device capable of automatic engine stop control in accordance with the driver's intention.

Means for Solving Problem

To achieve the aim above invention (1) mainly features a vehicular engine control device comprising a control unit performing a control stopping an engine installed on a vehicle when a preset stop condition is fulfilled, the vehicular engine control device further comprising:

a travelling information acquiring unit acquiring travelling information including vehicle speed information of a speed of the vehicle and steering information of the steering member, wherein the stop condition is set in which the vehicle speed information and the steering information include respective thresholds; and wherein the stop condition is sectioned into a plurality of regions with a steering threshold regarding the steering information, and the control unit uses one of sectioned stop conditions which is switched in accordance with variation in the vehicle speed information.

In the invention (1), the stop condition is sectioned into a plurality of regions with the steering threshold regarding the steering information of the steering member (first and second steering thresholds and first and second steering torque thresholds), and the control unit uses one of sectioned stop conditions which is switched in accordance with variation in the vehicle speed information.

More specifically, for example, the control unit performs the automatic stop control for automatically stopping the engine when the preset stop condition is fulfilled. As the stop condition, for example, such a state that the own vehicle speed is not greater than the reduced speed (for example, 10 km/h, etc.), a brake ON (braking operation) state, and an accelerator OFF state, when either of the steering angle of the steering member or the steering torque is below the steering threshold are exemplified.

Regarding this, "switching, in accordance with the change of the vehicle speed information, the stop condition which is sectioned into a plurality of regions with the steering thresholds (first and second steering angle threshold and the first and second steering torque thresholds)" means that, for example, "when the vehicle speed of the own vehicle is in the reduced speed range, the stop condition is set using the second steering angle threshold OA_th2 as the steering threshold and the second steering torque threshold OT_th2. On the other hand, when the vehicle speed of the own vehicle is in the extremely low speed range (including the vehicle speed is zero), the stop condition is set using second steering angle threshold OA_th2 and second steering torque threshold OT_th2 as the steering threshold". This can be exemplified as an embodiment.

According to invention (1), an automatic engine stop control according to the driver's driving intention can be provided.

Further, the invention (2) features that in the vehicle engine control device of invention (1) futures that the travelling information acquiring unit acquires a steering quantity of the steering member as the steering information of the steering member; wherein the threshold regarding the vehicle speed information is preset with at least a low vehicle speed which is regarded as the vehicle speed when the vehicle is stopping; wherein the control unit uses one of the sectioned stop conditions switched in accordance with variation in the vehicle speed information, the stop conditions being sectioned into a plurality of the regions with steering threshold regarding the steering information; and wherein the threshold regarding the steering quantity of the steering member as the stop condition used when the vehicle speed of the vehicle is in an extremely low speed range where the vehicle speed of the vehicle is below the low vehicle speed is set to be greater than the threshold regarding the steering quantity of the steering member as the stop condition used when the vehicle speed is in a reduce speed relation where the vehicle speed of the vehicle is greater than the low vehicle speed.

In the invention (2), the following configuration is adopted:

When the vehicle speed of its own vehicle is at the extremely low speed range, the automatic engine stop control execution timing is delayed by setting the steering threshold regarding the steering member to be greater than that in the case where the vehicle speed of its own vehicle is in the reduced speed range.

According to the invention (2), it is possible to pick up a delicate driver's intention according to a variation in scene which is applied to the automatic engine stop control.

Advantageous Effect of Invention

According to the vehicular engine control device according to the present invention, an automatic engine stop control according to the driver's intention can be provided.

BRIEF DESCRIPTION OF DRAWINGS

FIG. 5A is a time chart for illustrating operation of the vehicular engine control device.

FIG. 5B is a time chart for illustrating operation of the vehicular engine control device.

FIG. 5C is a time chart for illustrating operation of the vehicular engine control device.

FIG. 5D is a time chart for illustrating operation of the vehicular engine control device.

FIG. 5E is a time chart for illustrating operation of the vehicular engine control device.

MODES FOR CARRYING OUT INVENTION

Figure 1:
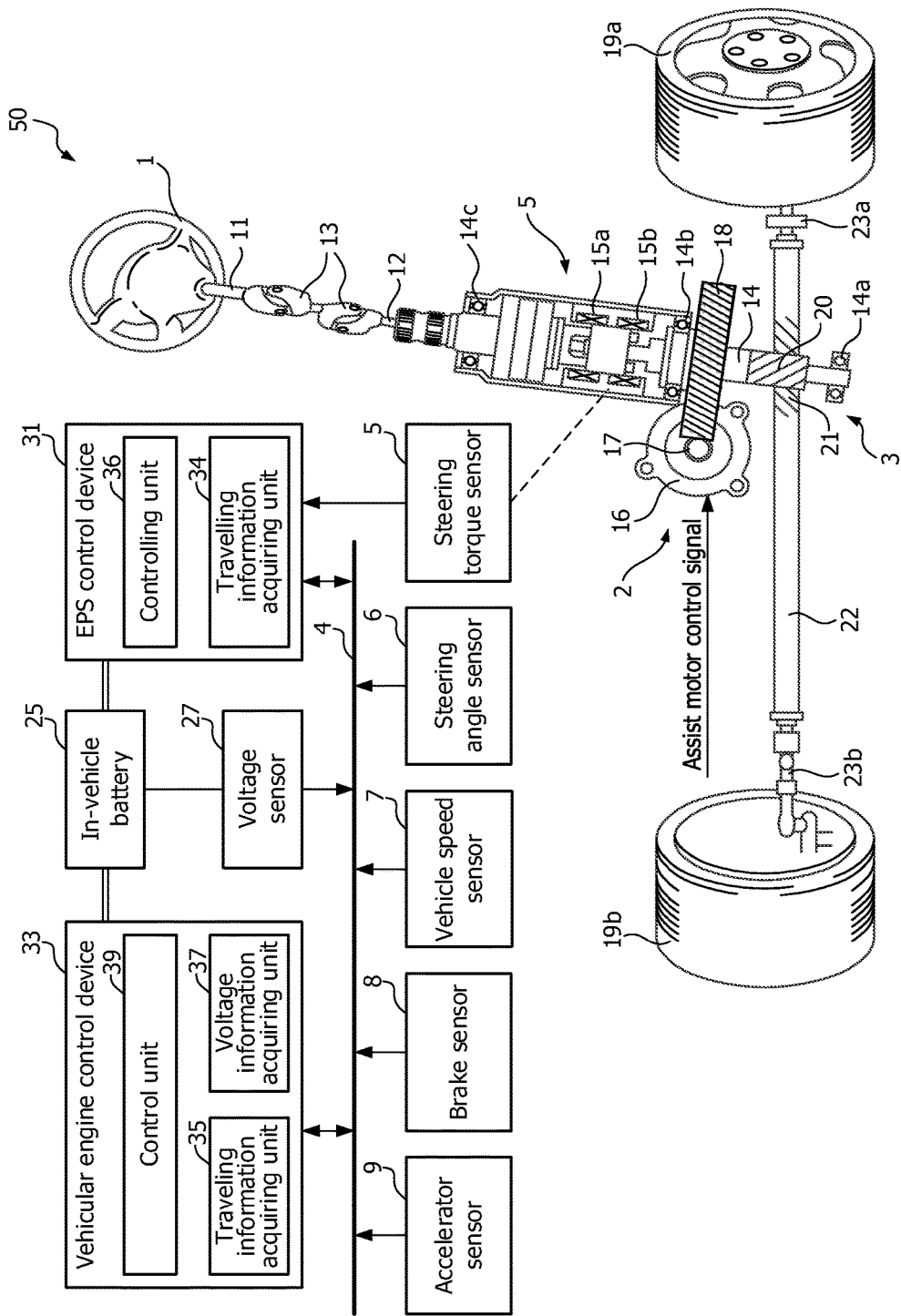
FIG. 1 is a block diagram of the vehicular engine control device according to the embodiment of the present invention including a peripheral portion thereof.

A vehicular engine control device according to the embodiments of the present invention is described in detail below with reference to the drawings.

In the drawings shown below, components having a common function or corresponding function to each other are generally designated with the same reference numerals. Further, for convenience for illustration, a size and a shape of any component may be modified or exaggerated.

[Structure of a Steering Device 50 Cooperatively Operating with a Vehicular Engine Control Device 33]

First, a structure of the steering device 50 cooperative with the vehicular engine control device 33 is described with reference to FIG. 1 below. FIG. 1 is a block diagram of the vehicular engine control device 33 according to the embodiment of the present invention including a peripheral portion thereof.

The steering device 50 includes, as shown in FIG. 1, a steering wheel (steering wheel) 1, a steering assist device 2, a steering device 3, a communication medium 4, such as CAN (Controller Area Network), a steering torque sensor 5, a steering angle sensor 6, a vehicle speed sensor 7 for detecting a speed (vehicle speed) of own vehicle, a brake sensor 8, an accelerator sensor 9, and a power steering (EPS) control device 31.

The steering wheel 1 corresponding to "steering member" in the present invention is used to change a vehicle travelling direction (not shown). A middle of the steering wheel 1 is mechanically connected to a first steering shaft 11 and a second steering shaft 12 through two universal joints 13 in series. The second steering shaft 12 is connected to a pinion shaft 14. The pinion shaft 14 is rotatably supported at a lower part, a middle part, and an upper part thereof through bearings 14a, 14b, 14c, respectively.

Provided on a side of the second steering shaft 12 out of the pinion shaft 14 is the steering torque sensor 5. The steering torque sensor 5 has a function of detecting a steering torque in magnitude and a direction inputted from the steering wheel 1 with, for example, solenoid types of coils 15a, 15b. The steering torque signal detected by the steering torque sensor 5 is inputted into the EPS control device 31.

The steering assist device 2 has a function of assisting a steering force on the steering wheel 1 by the driver. The steering assist device 2 is configured including an assist motor 16 for supplying an assist force for reducing the steering force on the steering wheel 1 by the driver and a warm wheel gear 18, provided on an output shaft of the assist motor 16, for engaging with a warm gear 17. The warm wheel gear 18 is installed on the pinion shaft 14 which serves as a rotation center.

Provided on the first steering shaft 11 is the steering angle sensor 6 for detecting a steering angle of the steering wheel 1. The steering angle signal detected by the steering angle sensor 6 is inputted into the EPS control device 31 and the vehicular engine control device 33 through the communication medium 4, respectively.

As the assist motor 16, for example, a three-phase brushless motor can be used which includes a stator (not shown) with a plurality of field coils and a rotor (not shown) rotating inside the stator. However, as the assist motor 16, a DC brushless motor can be used.

The steering device 3 has a function of transmitting a steering force on the steering wheel 1 by the driver to steered wheels 19*a*, 19*b*. The steering device 3 includes a pinion gear 20 installed on the pinion shaft 14, a rack shaft 22 able to reciprocate in a vehicle width direction, which includes rack teeth 21 geared with the pinion gear 20, tie rods 23*a*, 23*b* installed on both sides of the rack shaft 22, and the steered wheels 19*a*, 19*b* rotatably supported through the tie lodes 23*a*, 23*b*, respectively.

The EPS control device 31 has a function of controlling a steering assist force for the steering wheel 1 with reference to various types signals, such as a steering torque signal detected by the steering torque sensor 5, the steering angle signal detected by the steering angle sensor 6, a vehicle speed signal detected by the vehicle speed sensor 7 and a function of generating a control signal for permitting or inhibiting the automatic engine stop. The EPS control device 31 is configured including the microcomputer for an operation process and various types of peripheral circuits.

More specifically, the EPS control device 31 is configured including a travelling information acquiring unit 34, a controlling unit 36, and a storage (not shown).

The travelling information acquiring unit 34 of the EPS control device 31 has a function of acquiring the travelling information including steering information including the steering angle and a steering torque of the steering wheel 1 and travelling information including vehicle speed information by inputting signals from the various types of sensors including the steering torque sensor 5, the steering angle sensor 6, and the vehicle speed sensor 7. The travelling information including the vehicle information and the steering information acquired by the travelling information acquiring unit 34 is referred in the controlling unit 36 when an automatic engine stop control (permission and inhibition) signal and an automatic engine restart control (permission or inhibition) signals are generated.

The controlling unit 36 of the EPS control device 31 has a function of an EPS control function, a function of generating a control signal for permitting or inhibiting the automatic engine stop, and a function of generating a control signal for permitting or inhibiting the engine restart, with reference to the travelling information including the vehicle speed information and the steering information acquired by the travelling information acquiring unit 34.

In a storage of the EPS control device 31, a threshold regarding the vehicle speed information and a threshold regarding the steering information including the steering angle and the steering torque are previously stored.

The vehicle speed thresholds include a first vehicle threshold for an extremely low speed of, for example, 0 to 2 km/h and a second vehicle threshold for a reduced speed of, for example, 2 to 20 km/h. The extremely low speed corresponds to "low vehicle speed which can be regarded as "a substantially stop of the vehicle" in the present invention. In the vehicular engine control device 33 according to the embodiment of the present invention, the speed range of its own vehicle in which the automatic stop control of the engine (not shown) is performed is sectioned into a plurality of regions, i.e., the extremely low speed range between a stop speed (vehicle speed is zero) and the extremely low speed: and a reduced speed range between the extremely low speed and the reduced speed.

The steering threshold includes a steering angle threshed regarding the steering angle and a steering torque threshold regarding the steering torque.

In the description about the embodiments of the present invention, for convenience sake, it is assumed that the steering angle threshold and the steering torque threshold are expressed on the basis of a magnitude of steering except a steering direction.

The steering angle threshold described above includes a first steering angle threshold, a second steering angle threshold, a third steering angle threshold, and a fourth steering angle threshold. Similarly, the steering torque threshold described above includes a first steering torque threshold, a second steering torque threshold, a third steering threshold, and a fourth steering threshold. The first to fourth steering angle thresholds and the first to fourth steering torque thresholds are described in detail later.

Next, the engine stop condition determined by the controlling unit 36 of the EPS control device 31 is described below.

In the reduced speed range out of the speed ranges in which the automatic stop control for the engine is made, the controlling unit 36 of the EPS control device 31 determines whether the automatic stop of the engine is inhibited or not using the first steering angle threshold and the first steering torque threshold.

More specifically, the controlling unit 36 of the EPS control device 31 determines whether the automatic engine stop is inhibited when either of the steering angle or the steering torque included in the steering information out of the travelling information acquired by the travelling information acquiring unit 34 exceeds the first steering angel threshold or the first steering torque threshold. The automatic engine stop control signal indicating inhibition of the engine automatic stop is transmitted to the vehicular engine control device 33 through the communication medium 4.

On the other hand, in the extremely low speed range out of the speed ranges of the own vehicle in which the automatic engine stop control is made, the controlling unit 36 of the EPS control device 31 determines whether the automatic engine stop is inhibited or not using the second steering angle threshold and the second steering torque threshold as the steering threshold. More specifically, the controlling unit 36 of the EPS control device 31 determines that the automatic engine stop is inhibited when either of the steering angle or the steering torque included in the steering information out of the travelling information acquired by the travelling information acquiring unit 34 exceeds the first steering angle threshold or the second steering torque threshold. The automatic engine stop control signal indicating that the automatic engine stop is inhibited is transmitted to the vehicular engine control device 33 through the communication medium 4.

Next, the engine restart condition determined by the controlling unit 36 of the EPS control device 31 is described below.

When the automatic engine stop control is made when the vehicle speed of the own vehicle is at the extremely low speed, the controlling unit 36 of the EPS control device 31 determines whether the engine restart is permitted or not using the third steering angle threshold and the third steering torque threshold as the steering threshold.

More specifically, when the automatic engine stop control is made when the vehicle speed of the own vehicle is in the extremely low speed range, the controlling unit 36 of the EPS control device 31 determines that the engine restart is permitted when either of the steering angle or the steering torque included in the steering information out of the travelling information acquired by the travelling information acquiring unit 34, exceeds the third steering angle threshold or the third steering torque threshold. The automatic engine restart control signal, indicating that the engine restart is permitted, is transmitted to the vehicular engine control device 33 through the communication medium 4.

On the other hand, when the automatic engine stop is made when the vehicle speed of the own vehicle is at the reduced speed range, the controlling unit 36 of the EPS control device 31 determines that the engine restart is permitted or not irrespective of the steering information out of the travelling information acquired by the travelling information acquiring unit 34.

More specifically, when the automatic engine stop control is made when the vehicle speed of the own vehicle is at the reduced speed range, the controlling unit 36 of the EPS control device 31 determines that the engine restart is inhibited irrespective of the magnitude of the steering angle or the steering torque included in the steering information of the travelling information acquired by the travelling information acquiring unit 34. The engine restart control signal indicating that the engine restart is inhibited is transmitted to the vehicular engine control device 33 through the communication medium 4.

To avoid a misunderstanding, in the vehicular engine control device 33 according to the embodiments of the present invention, when the vehicle speed of the own vehicle is at the reduced speed range, the automatic engine restart based on the steering information (steering angle or the steering torque) is inhibited, but the automatic engine restart based on the operations of the brake-OFF and accelerator ON is permitted (not to inhibit).

Actually, when the automatic engine stop control is made when the vehicle speed of the own vehicle is at the reduced speed range, the controlling unit 36 of the EPS control device 31 determines whether the engine restart is permitted using the fourth steering angle threshold and the fourth steering torque threshold as the steering threshold. More specifically, the EPS control device 31 of the controlling unit 36 makes a determination that the engine restart is not permitted, i.e., make a determination that the engine restart is inhibited when the steering angle or the steering torque included in the steering information out of the travelling information acquired by the travelling information acquiring unit 34 are lower than both the forth steering angle threshold and the fourth steering torque threshold.

It should be noted that the fourth steering angle threshold and the fourth steering torque threshold are set to have values which are not general values. This is described using a setting example of the fourth steering torque threshold. For example, if it is assumed that generally possible steering angle values range from zero degrees to 720 degrees, the fourth steering angle is set to be "1000 degrees", which is not generally possible value. The fourth steering torque threshold is also set to have generally impossible value as described above.

In this case, both the steering angle and the steering torque included in the steering information out of the travelling information acquired by the travelling information acquiring unit 34 are necessarily lower than the fourth steering angle threshold or the fourth steering torque threshold. As a result, the controlling unit 36 of the EPS control device 31 determines that the engine restart is inhibited, i.e., makes a determination that the engine restart is inhibited. The automatic engine restart control signal, indicating that the engine restart is inhibited, is transmitted to the vehicular engine control device 33 through the communication medium 4.

The steering threshold (the second steering angle threshold and the second steering torque threshold) regarding the steering quantity of the steering wheel (steering member) 1 as the stop condition used when the vehicle speed of own vehicle is at the extremely slow speed range is set to be greater than the steering threshold (first steering angle threshold and the first steering torque threshold) regarding the steering quantity of the steering wheel (steering member) 1 as the stop condition used when the vehicle speed of the own vehicle is at the reduced speed not lower than the extremely slow speed range of the own vehicle.

The controlling unit 36 of the EPS control device 31 operates to switchably use one of stop conditions in accordance with variation of the vehicle speed information, the stop conditions being sectioned into a plurality of regions using the steering thresholds (first to fourth steering angle thresholds and first to fourth steering torque thresholds).

According to the steering device 50 configured as described above, when the steering wheel 1 is operated, the traveling direction of the vehicle can be changed arbitrarily with an appropriate steering assist force.

Connected to the communication medium 4 is a voltage sensor 27 for detecting a power source voltage of an in-vehicle battery 25 for supplying a power to various types of devices including the EPS control device 31 and a vehicle engine control device (hereinafter may be referred to as "engine control device") 33.

The vehicular engine control device 33 has such a function that when a preset stop condition is fulfilled the engine installed on the own vehicle is stopped to save fuel and reduce emission and a noise level, and such a function that the engine restart is performed when the restart condition to be previously set during the stop of the engine is fulfilled. The vehicular engine control device 33 is configured including a microcomputer for operation processes and various types of peripheral circuits.

More specifically, the vehicular engine control device 33 is configured including a traveling information acquiring unit 35, a voltage information acquiring unit 37, and a control unit 39.

The traveling information acquiring unit 35 of the vehicular engine control device 33 has a function of acquiring the steering information including the steering angle and the steering torque of the steering wheel 1 and the travelling information including the vehicle information, the brake operation information, and accelerating operation information by inputting signals from the steering torque sensor 5, the steering angle sensor 6 and the vehicle speed sensor 7, the brake sensor 8, and the accelerator sensor 9. The traveling information including the steering information, the vehicle speed information, the brake operation information, and the accelerator operating information acquired by the traveling information acquiring unit 35, is properly referred when the automatic engine stop control (permission or inhibition) and the automatic engine restart control (permission or inhibition) are performed.

The voltage information acquiring unit 37 has a function of acquiring voltage source voltage information of the in-vehicle battery 25 by inputting a voltage signal of the voltage sensor 27 through the communication medium 4. The voltage source voltage information of the in-vehicle battery 25 acquired by the voltage information acquiring unit 37 is referred when the automatic engine restart control is performed by the control unit 39.

The control unit 39 of the vehicular engine control device 33 has a function of performing the automatic engine stop control for stopping the engine installed on the own vehicle when the preset stop condition is fulfilled.

When three rules of the stop condition, which serves as a trigger for the automatic engine stop control, are fulfilled, the control unit 39 of the vehicular engine control device 33 generally regards this as the driver having an intention to automatically stop the engine and performs the automatic engine stop control. The three rules are a condition in which the vehicle speed of the own vehicle is lower than the reduced speed (for example, 2 to 20 km/h), a brake ON condition in which a brake pedal (not shown) is pressed, and an accelerator OFF condition in which the accelerator pedal (not shown) is not pressed.

However, the vehicular engine control device 33 according to the embodiment of the present invention adopts the steering information (including a steering angle and steering torque) regarding the steering wheel 1 in addition to the three rules, i.e., the vehicle speed, the brake ON/OFF state, and accelerator ON/OFF state.

The control unit 39 of the vehicular engine control device 33 operates to inhibit the automatic engine stop when the automatic engine stop control signal transmitted from the side of the EPS control device 31 includes inhibition of the automatic engine stop, irrespective of whether the stop condition including the above-described three rules serving as the trigger is fulfilled.

On the other hand, the control unit 39 of the vehicular engine control device 33 has a function of performing the automatic engine restart control for automatically restart the engine, when the preset restart condition is fulfilled while the engine stops.

When either of the brake OFF state in which the brake pedal is not pressed or the accelerator ON state in which the accelerator pedal is pressed, occurs, the control unit 39 of the vehicular engine control device 33 generally regards this state as having a driving intention of starting the own vehicle, and performs the automatic engine restart control.

However, the vehicular engine control device 33 according to the embodiment of the present invention adopts the steering information (including the steering angle and the steering torque) regarding the steering wheel 1 in addition to the brake ON/OFF state and the accelerator ON/OFF state as the restart condition for automatically restarting the engine.

The control unit 39 of the vehicular engine control device 33 operates to inhibit the engine restart, when the engine restart control signal transmitted from the EPS control device 31 includes an operation of inhibiting the engine restart, irrespective of whether the restart condition, serving as a trigger for the engine restart control, is fulfilled.

More specifically, the control unit 39 allows the fulfillment of the restart condition based on the steering quantity (steering information) regarding the steering wheel 1 when the stop condition is fulfilled when the vehicle speed of the own vehicle is in the extremely slow region in which the vehicle speed is under the extremely low speed. On the other hand, when the control unit 39 operates so as to inhibit the fulfillment of the restart condition based on the steering quantity (steering information) regarding the steering wheel 1 when the vehicle speed of the own vehicle is in the reduced speed range in which the vehicle speed is equal to or greater than the extremely low speed.

However, when the stop condition is fulfilled as the vehicle speed of own vehicle is in the reduced speed range, the automatic engine stop control is performed. After this, as the vehicle speed of own vehicle decreases to the extremely low speed range, when the stop condition is fulfilled, the control unit 39 operates to allow the fulfillment of the restart condition based on the steering quantity on the steering wheel 1 because the vehicle speed of own vehicle is in the extremely low speed range.

When the inhibition of fulfillment of the restart condition based on the steering quantity (steering information) regarding the steering wheel 1 is kept also for such a case, there is a fear of influence to the driver's intention based on the steering quantity.

The EPS control device 31 and the vehicular engine control device 33 correspond to the vehicular engine controller accordance to the present invention.

[Operation of the Vehicular Engine Control Device 33 According to the Embodiment of the Present Invention]

Next operations of the vehicular engine control device 33 according to the embodiment of the present invention is described suitably referring to the drawings in FIGS. 2A to 2E, 3A to 3E, 4A to 4E, 5A to 5J, and 6A to 6E.

FIGS. 2A to 2E illustrate basic operations of the vehicular engine control device 33 according to the embodiment of the present invention. More specifically, FIGS. 2A to 2E represent an output characteristic of the vehicle speed sensor 7, and an output characteristic of the steering angle sensor 6, an output characteristic of the steering torque sensor 5, an ON/OFF output characteristic of the brake sensor 8, and an ON/OFF output characteristic of the engine in time base in a scene in which the own vehicle travelling in a substantially straight state approaches an intersection with a red signal while reducing the vehicle speed (automatic engine stop), stops for waiting signal change. After that, the engine is restarted on the basis of the release of braking operation (the brake sensor 8 becomes OFF state), and the vehicle passes the intersection with the straight travelling state being kept.

During time t0 to t1 shown in FIGS. 2A to 2E, the own vehicle travels on a straight road with acceleration from a stop state to a certain speed range (see FIGS. 2A, 2B, 2C, and 2E). At this instance, the ON/OFF output characteristic of the brake sensor 8 is in an OFF state (see FIG. 2D). Further, the ON/OFF output characteristic of the accelerator sensor 9 is in an ON state (not shown).

At time t1 to t2 shown in FIGS. 2A to 2E, the own vehicle travels on a straight road at a constant speed and then starts to reduce the speed (see FIGS. 2A, 2B, 2C, and 2E). At time t2, the ON/OFF output characteristic of the brake sensor 8 is switched to an ON state from the OFF state (see FIG. 2D). Further, the ON/OFF output characteristic of the accelerator sensor 9 changes to an OFF state from the ON state in contrast to the brake sensor 8.

For example, it is assumed that the vehicle speed of the own vehicle at time t2 is about 30 km/h.

At time t2 to t3 shown in FIGS. 2A to 2E, the own vehicle keeps the reduced speed travelling on the straight road (see FIGS. 2A, 2B, 2C, and 2E). During this, the ON/OFF output characteristic of the brake sensor 8 is in the ON state (see FIG. 2D). Further, the ON/OFF output characteristic of the accelerator sensor 9 is in an OFF state (not shown), in contrast to the brake sensor 8.

The vehicle speed of the own vehicle at time t3 has decreased to the reduced speed (for example, 10 km/h, etc.).

Figure 2A:
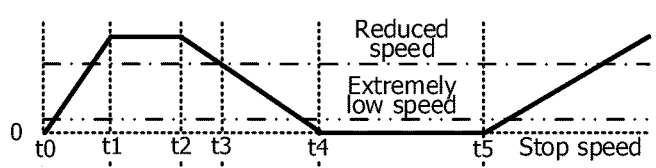
FIG. 2A is a time chart for illustrating operation of the vehicular engine control device.
Figure 2B:
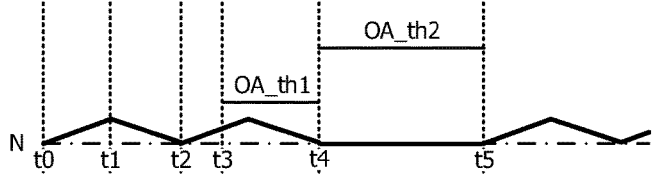
FIG. 2B is a time chart for illustrating operation of the vehicular engine control device.

During time t3 to t4 shown in FIGS. 2A to 2E, when the vehicle speed of the own vehicle is in the reduced speed range, a first steering angle threshold value OA_th1 is set with respect to the output characteristic of the steering angle sensor 6 shown in FIG. 2B (see FIG. 2B). In the example shown in FIG. 2B, the output characteristic of the steering angle sensor 6 fall below the first steering angle threshold OA_th1, which indicates that the own vehicle is in a straight traveling state. In this case, the vehicular engine control device 33 regards this state as no occurrence of driving intention including right or left turn.

Figure 2C:
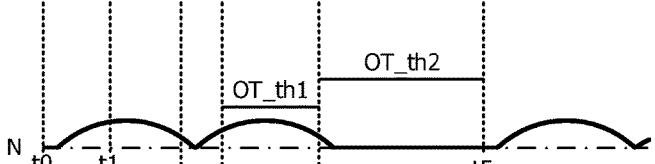
FIG. 2C is a time chart for illustrating operation of the vehicular engine control device.
Figure 2D:
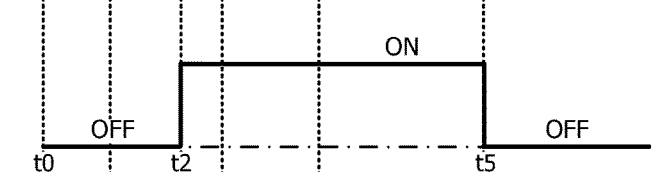
FIG. 2D is a time chart for illustrating operation of the vehicular engine control device.
Figure 2E:
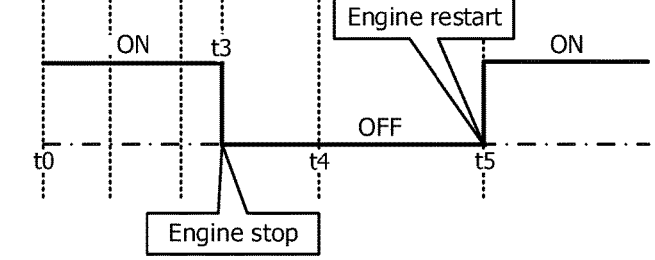
FIG. 2E is a time chart for illustrating operation of the vehicular engine control device.

Further, at time t3 to t4 shown in FIGS. 2A to 2E, a first steering torque threshold OT_th1 is set on the output characteristic of the steering torque sensor 5 when the vehicle speed of the own vehicle is in the reduced speed range (see FIG. 2C). In the example shown in FIG. 2C, the output characteristic of the steering angle sensor 6 is below the first steering torque threshold OT_th1, and the own vehicle is in a substantially straight travelling state. Also in this case, similar to the above-description, the vehicular engine control device 33 regards this states as no occurrence of the driving intention of right or left turn.

At time t3 shown in FIGS. 2A to 2E, the vehicular engine control device 33 performs the automatic stop control for automatically stop the engine when four stop conditions for automatically stopping the engine (the vehicle speed of own vehicle is at the reduced speed (for example, 10 km/h or lower), in the brake ON state, in the accelerator OFF state, and both the steering angle and steering torque fall below the first steering threshold OA_th1 and the first steering torque threshold OT_th1, respectively) are fulfilled. This causes the engine to stop its operation (see FIG. 2E).

During time t3 to t4 shown in FIGS. 2A to 2E, the own vehicle enters a stop state after reduced speed travelling on the straight road is kept (see FIGS. 2A, 2B, and 2C). During this the ON/OFF output characteristic of the brake sensor 8 is in the ON state (see FIG. 2D). Further, the ON/OFF output characteristic is in an OFF state (not shown) in contrast to the brake sensor 8.

In addition, the vehicle speed of the own vehicle at time t4 falls to a stop vehicle speed (0 km/h).

During time t4 to t5 shown in FIGS. 2A to 2E, the own vehicle keeps the stop state (see FIGS. 2A, 2B, and 2C). During this the ON/OFF output characteristic of the brake sensor 8 is an ON state (see FIG. 2D). Further, the ON/OFF output characteristic of the accelerator sensor 9 is on an OFF state (not shown) in contrast to the brake sensor 8. The ON/OFF output characteristic of the engine keeps an OFF state (see FIG. 2E).

During time t4 to t5 shown in FIGS. 2A to 2E, for the output characteristic of the steering angle sensor 6 shown in FIG. 2B when the own vehicle keeps the stop state, a second steering angle threshold OA_th2 is set (see FIG. 2B). In the example shown in FIG. 2B, the output characteristic of the steering angle sensor 6 falls below the second steering angle threshold OA_th2. In this case, the vehicular engine control device 33 regards this as no occurrence of driver's driving intention including turning right or left.

Further, during time t4 to t5 shown in FIGS. 2A to 2E, for the output characteristic of the steering torque sensor 5 shown in FIG. 2C the second steering angle threshold OA_th2 is set (see FIG. 2C). In the example shown in FIG. 2C, the output characteristic of the steering angle sensor 6 is below the second steering angle threshold OA_th2 Also in this case, as similar to the above-described case, the vehicular engine control device 33 regards this as no occurrence of driver's driving intention including turning right or left.

At time t5 shown in FIGS. 2A to 2E, the control unit 39 of the vehicular engine control device 33 waits for fulfillment of the engine restart condition (including the braking operation release condition, an accelerator operation execution condition due to accelerator ON state, or the condition that the steering angle of the steering wheel 1 is not smaller than the second steering angle threshold OA_th2) and executes the restart of the engine upon the fulfillment. This causes the restart of the engine (see FIG. 2E).

Next, the automatic engine stop control operation is described below with reference to FIGS. 3A to 3E in such a scene that the own vehicle performs the reduced speed travelling to pass an intersection with turning, for example, right (without momentary stop).

FIGS. 3A to 3E illustrate the output characteristic of the vehicle speed sensor 7, the output characteristic of the steering angle sensor 6, the output characteristic of the steering torque sensor 5, and the ON/OFF output characteristic of the engine in, for example, the scene that the own vehicle performs the reduced speed travelling to pass an intersection with turning, for example, right.

During time t10 to t11 shown in FIGS. 3A to 3E, the own vehicle travels on the straight road from the stop state to a certain vehicle speed range (see FIGS. 3A, 3B, 3C, and 3E) with acceleration.

Figure 3A:
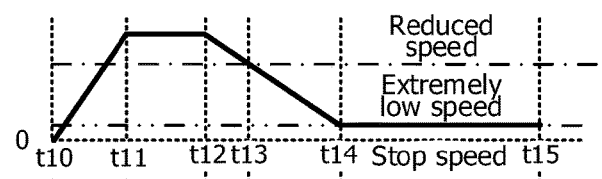
FIG. 3A is a time chart for illustrating operation of the vehicular engine control device.
Figure 3B:
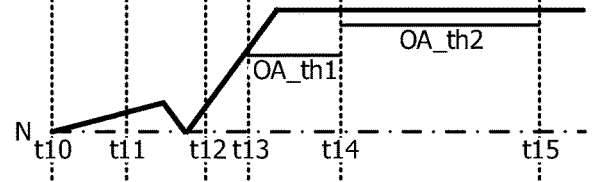
FIG. 3B is a time chart for illustrating operation of the vehicular engine control device.
Figure 3C:
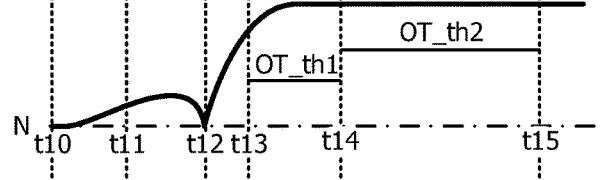
FIG. 3C is a time chart for illustrating operation of the vehicular engine control device.
Figure 3D:
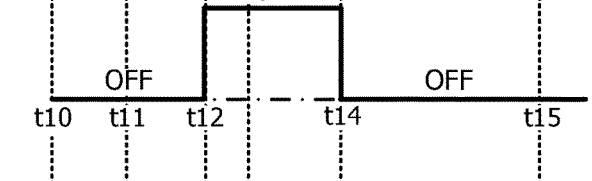
FIG. 3D is a time chart for illustrating operation of the vehicular engine control device.
Figure 3E:
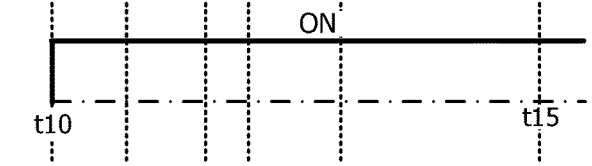
FIG. 3E is a time chart for illustrating operation of the vehicular engine control device.

During this, the ON/OFF output characteristic of the brake sensor 8 is in an OFF state (see FIG. 3D). Further, the ON/OFF output characteristic of the accelerator sensor 9 is in an ON state in contrast to the brake sensor 8.

After travelling on the straight road at a constant vehicle speed, during time t11 to t13 shown in FIGS. 3A to 3E, the own vehicle starts the reduced speed travelling while performing a right turn from approximately time t12. During this, the ON/OFF output characteristic of the brake sensor 8 is in an OFF state during time t11 to t12, but after this, during time t12 to t13 in an ON state (see FIG. 3D). Further, the ON/OFF output characteristic of the accelerator sensor 9 is in an ON state during time t11 to t12 in contrast to the brake sensor 8, but, after this, during time t12 to t13 in an OFF state (not shown).

The vehicle speed of the own vehicle at time t13 falls to the reduced speed (for example, approximately 2 to 20 km/h).

During time t13 to t14 shown in FIGS. 3A to 3E, the own vehicle keeps a right turning traveling state, gradually reducing the vehicle speed (see FIGS. 3A, 3B, 3C, and 3E). During this, the ON/OFF output characteristic of the brake sensor 8 is in an ON state (see FIG. 3D). On the other hand, the ON/OFF output characteristic of the accelerator sensor 9 is in an OFF state (not shown) in contrast to the brake sensor 8.

Further, the vehicle speed of the own vehicle at time t14 falls below the extremely low speed (for example, approximately 0 to 2 km/h). The extremely low speed corresponds to "a low vehicle speed able to be regarded as the vehicle being stopping".

During time t13 to t14 shown in FIGS. 3A to 3E, a first steering angle threshold OA_th1 is set for the output characteristic of the steering angle sensor 6 shown in FIG. 3B in a case where the vehicle speed of the own vehicle is in the reduced speed range. In the example shown in FIG. 3B, the output characteristic of the steering angle sensor 6 exceeds the first steering angle threshold OA_th1.

During time t13 to t14 shown in FIGS. 3A to 3E, the first steering angle threshold OT_th1 is set for the output characteristic of the steering torque sensor 5 shown in FIG. 3C while the vehicle speed of the own vehicle is in the reduced speed range. In the example shown in FIG. 3C, the output characteristic of the steering torque sensor 5 exceeds the first steering torque threshold OA_th1.

When at least one of the output characteristics of the steering angle sensor 6 and the steering torque sensor 5 exceeds a first steering angle threshold OA_th1, or the first torque threshold OT_th1, the control unit 39 of the vehicular engine control device 33 operates to determine that the control unit 39 inhibits the automatic engine stop control while regarding this as occurrence of driver's driving intention including turning right or left or making a revolution.

On reflection, both the output characteristic of the steering angle sensor 6 and the steering torque sensor 5 exceed the first steering angle threshold OA_th1 and the first steering torque threshold OT_th1, respectively, during the time t13 to t14 shown in FIGS. 3A to 3E. Accordingly, the control unit 39 of the vehicular engine control device 33 regards this state as no occurrence of driver's driving intention including turning right or left and revolution and makes a determination that the control unit 39 inhibits the automatic engine stop control.

As a result, the automatic engine stop is inhibited based on that the steering angle or the steering torque exceeds the first steering angle threshold OA_th1 or the first steering torque threshold OT_th1 (the fourth stop condition is not fulfilled) and the engine operation is continued though the vehicle speed of the own vehicle is not greater than the reduced speed in the brake ON state, and the accelerator OFF state, (three rules of the stop condition are fulfilled).

During time t14 to t15 shown in FIGS. 3A to 3E, the own vehicle keeps the right turning state at the extremely low speed (see FIGS. 3A, 3B, 3C, and 3E). During this, the ON/OFF output characteristic of the brake sensor 8 is in the OFF state (see FIG. 3D). Further, the ON/OFF output characteristic of the accelerator sensor 9 is in the ON state in contrast to the brake sensor 8 (not shown).

During time t14 to t15 shown in FIGS. 3A to 3E, the second steering angle threshold OA_th2 is set for the output characteristic of the steering angle sensor 6 shown in FIG. 3B in a case where the vehicle speed of the own vehicle is in the extremely low speed range. In the example shown in FIG. 3B, the output characteristic of the steering angle sensor 6 exceeds the second steering angle threshold OA_th2.

Further, during time t14 to t15 shown in FIGS. 3A to 3E, a second steering torque threshold OT_th2 is set for the output characteristic of the steering torque sensor 5 shown in FIG. 3C in the extremely low speed range of the vehicle speed of the own vehicle (see FIG. 3C). In the example shown in FIG. 3C, the output characteristic of the steering torque sensor 5 exceeds the second steering torque threshold OT_th2.

Incidentally, at least one of the output characteristics of the steering angle sensor 6 and the steering torque sensor 5 exceeds the second steering angle threshold OA_th2 or the second steering torque threshold OT_th2, the control unit 39 of the vehicular engine control device 33 regards this state as occurrence of the driver's driving intention including the right or left turning or revolution and operates to determine that the control unit 39 inhibits the automatic engine stop control.

On reflection, during time t14 to t15 shown in FIGS. 3A to 3E, both the output characteristics of the steering angle sensor 6 and the steering torque sensor 5 exceed the second steering angle threshold OA_th2 or the second steering torque threshold OT_th2. Accordingly, the control unit 39 of the vehicular engine control device 33 regards this state as occurrence of a new driver's driving intention including the right or left turning, or revolution, and makes a determination that the automatic engine stop control is inhibited.

As a result, during time t14 to t15, the automatic engine stop is inhibited based on that the steering angle or the steering torque exceeds the steering thresholds (second steering angle threshold OA_th2 or the second steering torque threshold OT_th2) in addition to that the vehicle speed of the own vehicle is not greater than the reduced speed, in the brake OFF state, and in the accelerator OFF state (one condition out of three rules is not fulfilled), and the engine operation is continued.

Next, the automatic engine stop control operation in such a scene that the own vehicle stops after traveling on a spiral road is described below with reference to FIGS. 4A to 4E.

FIGS. 4A to 4E illustrate the output characteristic of the vehicle speed sensor 7, the output characteristic of the steering angle sensor 6, the output characteristic of the steering torque sensor 5, the ON/OFF output characteristic of the brake sensor 8, and the ON/OFF output characteristic of the engine, in a time-base manner in the scene that the own vehicle stops after traveling on the spiral road.

During time t20 to t21 shown in FIGS. 4A to 4E, the own vehicle travels at a constant speed on a spiral road with revolution movement (see FIGS. 4A, 4B, 4C, and 4E). During this, the ON/OFF output characteristic of the brake sensor 8 is in an OFF state (see FIG. 4D). Further the ON/OFF output characteristic of the accelerator sensor 9 is in an ON state in contrast to the brake sensor 8 (not shown).

During time t21 to t23 shown in FIGS. 4A to 4E, the own vehicle performs the reduced speed travelling during which the own vehicle gradually decreases the vehicle speed with revolution movement and then stops at time t23 (see FIGS. 4A, 4B, 4C, and 4E). During this, the ON/OFF output characteristic of the brake sensor 8 (see FIG. 4D) is the ON state. Further, the ON/OFF output characteristic of the accelerator sensor 9 is in an OFF state in contrast to the brake sensor 8.

Further, during time from time t22 to t23 shown in FIGS. 4A to 4E, the first steering angle threshold OA_th1 and the first steering torque threshold OT_th1 are set (see FIGS. 4B and 4C), which is similar to the examples shown in FIGS. 2A to 2E and FIG. 3A to 3E. In the example shown in FIG. 4B, the output characteristic of the steering angle sensor 6 exceeds the first steering angle threshold OA_th1. Further, in the example shown in FIG. 4C, the output characteristic of the steering torque sensor 5 exceeds the first steering torque threshold OT_th1. Accordingly, the control unit 39 of the vehicular engine control device 33 regards this state as occurrence of the driver's driving intention including right or left turn, or revolution and determines that the control unit 39 inhabits the automatic engine stop control.

As a result, during time t22 to t23, though the vehicle speed of the own vehicle is below the reduced speed in the brake ON state and in the accelerator OFF state (the stop conditions of three rules are fulfilled), the automatic engine stop is inhibited and the engine operation is continued on the basis of the fact that the steering angle or the steering torque exceeds the first steering angle threshold OA_th1 or the first steering torque threshold OT_th1 (the fourth stop condition is not fulfilled).

Figure 4A:
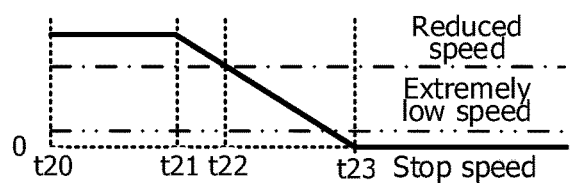
FIG. 4A is a time chart for illustrating operation of the vehicular engine control device with comparison with a comparative example.
Figure 4B:
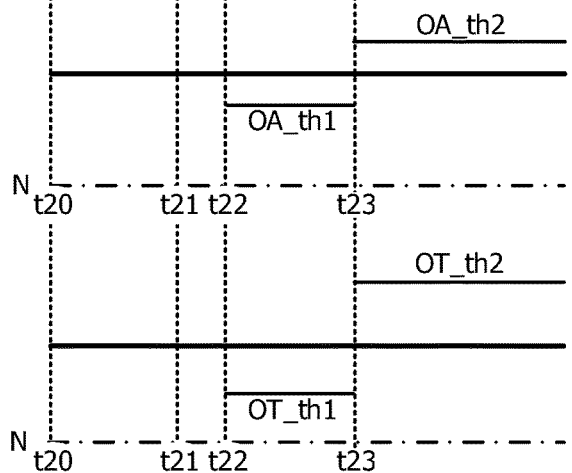
FIG. 4B is a time chart for illustrating operation of the vehicular engine control device with comparison with a comparative example.
Figure 4C:
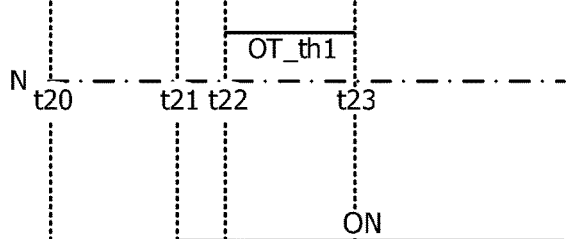
FIG. 4C is a time chart for illustrating operation of the vehicular engine control device with comparison with a comparative example.
Figure 4D:
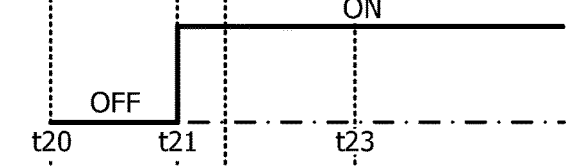
FIG. 4D is a time chart for illustrating operation of the vehicular engine control device with comparison with a comparative example.
Figure 4E:
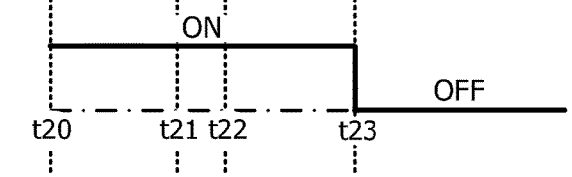
FIG. 4E is a time chart for illustrating operation of the vehicular engine control device with comparison with a comparative example.

After time t23 shown in FIGS. 4A to 4E, the own vehicle keeps the stop state (see FIGS. 4A, 4B, and 4C). During this the ON/OFF output characteristic of the brake sensor 8 is in the ON state (see FIG. 4B). Further, the ON/OFF output characteristic of the accelerator sensor 9 is in the OFF state (not shown) in contrast to the brake sensor 8.

After time t23 shown in FIGS. 4A to 4E, the second steering angle threshold OA_th2 and the second steering torque threshold OT_th2 are respectively set (see FIGS. 4B and 4C), which is similar to the examples in FIG. 2A to FIG. 2E and FIGS. 3A to 3E. In the example shown in FIG. 4B, the output characteristic of the steering angle sensor 6 is below the second steering angle threshold OA_th2. Further, the example shown in FIG. 4C, the output characteristic of the steering torque sensor 5 is below the second steering torque threshold OT_th2. Accordingly, the control unit 39 of the vehicular engine control device 33 regards the state as no occurrence of the driver's driving intention including right and left turning and makes determination for permitting the automatic engine stop control.

After time t23 shown in FIGS. 4A to 4E, the vehicle speed of the own vehicle is below the reduced speed in the brake ON state in the accelerator OFF state (the stop condition of the three rules are fulfilled). In addition to this, both the steering angle and the steering torque are below the steering thresholds (the second steering angle threshold OA_th2 and the second steering torque threshold OT_th2, respectively) (the fourth stop condition is fulfilled). Based on this, the engine operation is automatically stopped. As a result, after time t23, the ON/OFF output characteristic of the engine is in the OFF state (see FIG. 4E).

Next, the automatic engine restart control operation made in such a scene that stationary-steering is performed on the steering wheel 1 in the stop state of the own vehicle as a result of the automatic engine stop control made when the vehicle speed of the own vehicle is in the reduced speed range, is described below with reference to FIGS. 5A to 5E and 5F to 5J.

FIGS. 5A to 5E and FIG. 5F to 5J represent the output characteristic of the vehicle speed sensor 7, the output characteristic of the steering angle sensor 6, and the output characteristic of the steering torque sensor 5, the ON/OFF output characteristic of the brake sensor 8, and the ON/OFF output characteristic of the engine in time-base manner in such a scene that the stationary-steering is performed in the stop state of the own vehicle after the automatic engine stop control is made when the vehicle speed of the own vehicle is in the reduced speed range.

During time t30 to t31 shown in FIGS. 5A to 5E, the own vehicle travels at a constant speed on the straight road (see FIGS. 5A, 5B, 5C, and 5E). During this, the ON/OFF output characteristic of the brake sensor 8 is in the OFF state (see FIG. 5D). Further, the ON/OFF output characteristic of the accelerator sensor 9 is in the ON state in contrast to the brake sensor 8.

During time t31 to time t33 shown in FIGS. 5A to 5E, the own vehicle performs the reduced travelling in which the vehicle speed of the own vehicle gradually decreases, and then at time t33, the own vehicle stops (see FIGS. 5A, 5B, 5C, and 5E). During this, the ON/OFF output characteristic of the brake sensor 8 is in the ON state (see FIG. 5D). Further, the ON/OFF output characteristic of the accelerator sensor 9 is in the OFF state (not shown) in contrast to the brake sensor 8.

During time t32 to t33 shown in FIGS. 5A to 5E, the first steering angle threshold OA_th1 and the first steering torque threshold OT_th1 are respectively set (see FIGS. 5B and 5C), which is similar to FIG. 4A to FIG. 4E. In the example shown in FIG. 5B, the output characteristic of the steering angle sensor 6 is below the first steering angle threshold OA_th1. Further, in the example shown in FIG. 5C, the output characteristic of the steering torque sensor 5 is below the first steering torque threshold OT_th1. Accordingly, the control unit 39 of the vehicular engine control device 33 regards the state as no occurrence of the driver's driving intention including right or left turn or revolution, and determines that the control unit 39 permits the automatic engine stop control.

As a result, during time t32 to t33, the vehicle speed of the own vehicle is not greater than the reduced speed in the brake ON state in the accelerator OFF state (the stop condition of three rules is fulfilled). In addition to this, the steering angle or the steering torque is below the steering thresholds (the first steering angle threshold OA_th1 or the first steering torque threshold OT_th1) (the fourth stop condition is fulfilled). Based on this, the engine operation being traveling at a vehicle speed in the reduced speed range is automatically stopped.

During time t33 to time t34 shown in FIGS. 5A to 5E, in the own vehicle keeping the stop state a large stationary-steering on the steering wheel 1 is performed in, for example, a right turn direction as time passes (see FIGS. 5A, 5B, 5C, and 5E). During this, the ON/OFF output characteristic of the brake sensor 8 is in the ON state (see FIG. 5D). Further the ON/OFF output characteristic of the accelerator sensor 9 is in the OFF state (not shown) in contrast to the brake sensor 8.

In the own vehicle keeping the stop state after the time t34 shown in FIGS. 5A to 5E, the steering wheel 1 is kept in a s stationary-steering state in, for example, right turn direction (see FIGS. 5A, 5B, 5C, and 5E). During this, the ON/OFF output characteristic of the brake sensor 8 is in the ON state (see FIG. 5D). Further, the ON/OFF output characteristic of the accelerator sensor 9 is in the OFF state (not shown) in contrast to the brake sensor 8.

After time t33 shown in FIGS. 5A to 5E, the second steering angle threshold OA_th2 and the second steering torque threshold OT_th2 are respectively set (see FIGS. 5B and 5C), which is similar to FIG. 4B and FIG. 4C. In the example shown in FIG. 5A to 5E, the automatic engine stop control is performed at timing of time t32.

Incidentally, after time t33 shown in FIGS. 5A to 5E, to perform the automatic engine restart control, a third steering angle threshold OA_th3 is set for the output characteristic of the steering angle sensor 6 shown in FIG. 5B (see FIG. 5B). In the example shown in FIG. 5B, the output characteristic of the steering angle sensor 6 exceeds the third steering angle threshold OA_th3 after time t34.

On the other hand, to perform the automatic engine restart control after time t33 shown in FIGS. 5A to 5E, a third steering torque threshold OT_th3 is set for the steering torque sensor 5 shown in FIG. 5C (see FIG. 5C). In the example shown in FIG. 5C, the output characteristic of the steering torque sensor 5 exceeds the third steering torque threshold OT_th3 after time just after time t34.

In this point, at least one of the output characteristics of the steering angle sensor 6 and the steering torque sensor 5 exceeds the third steering angle threshold OA_th3 or the third steering torque threshold OT_th3, the control unit 39 of the vehicular engine control device 33 determines that the automatic engine restart control is performed.

This is because the engine restart by a sel-motor becomes difficult because a battery voltage decreases as the power supplied to the assist motor 16 becomes large, which is caused by a large steering load during the stationary-steering of the steering wheel 1 in, for example, a vehicle having such a specification that the electric power steering function turns on at the automatic engine stop.

On the other hand, for example, in the vehicle having such a specification that the electric power steering function does not turn on upon the automatic engine stopping, a steering force necessary to turn the steered wheels 19a, 19b by the driver becomes large, which forces a large load on the driver. This is a cause for the above-mentioned determination.

Now, after time t34 shown in FIGS. 5A to 5E, the output characteristic of the steering angle sensor 6 exceeds the third steering angle threshold OA_th3. Accordingly, the control unit 39 of the vehicular engine control device 33 makes a determination of permitting the automatic engine restart control.

As a result, at time t34, the engine is automatically restarted (see FIG. 5E) as a result of permission of the automatic power generation on the basis of the fact that the steering angle or the steering torque exceeds a steering threshold (the third steering angle threshold OA_th3 or the third steering torque threshold OT_th3) though the vehicle is in the brake ON state in the accelerator OFF state.

Figure 5F:
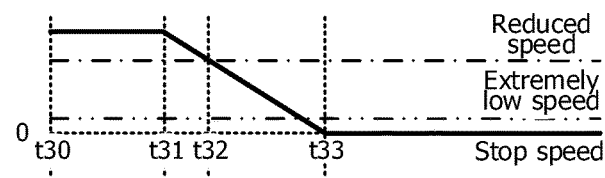
FIG. 5F is a time chart for illustrating operation of the vehicular engine control device.

Next, a modification regarding FIGS. 5A to 5E is described with reference to FIGS. 5F to 5E. A difference between FIGS. 5A to 5E and FIGS. 5F to 5J is in output characteristic levels of the steering angle and the steering torque with reference to setting levels of the third steering angle threshold OA_th3 and the third steering torque threshold OT_th3, which are set after time t33 shown in FIGS. 5A to 5E.

Further, it is common between FIGS. 5A to 5E and FIGS. 5F to 5J that the engine is stopping via a process in which the engine is automatically stopped while the vehicle speed of the own vehicle is in the reduced speed range.

Figure 5G:
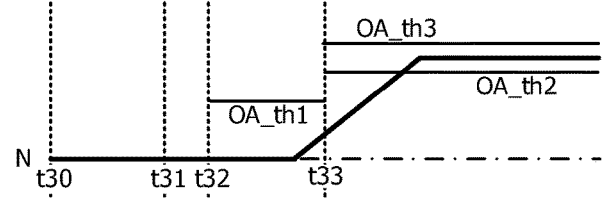
FIG. 5G is a time chart for illustrating operation of the vehicular engine control device.
Figure 5H:
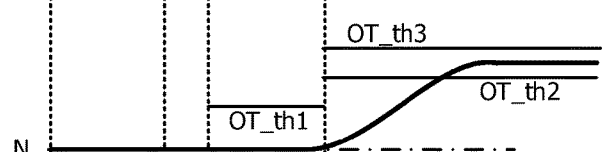
FIG. 5H is a time chart for illustrating operation of the vehicular engine control device.
Figure 5I:
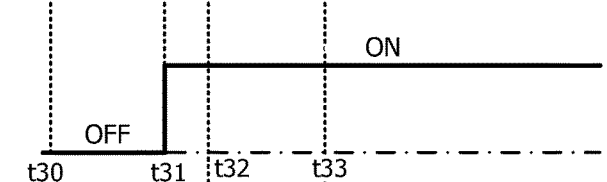
FIG. 5I is a time chart for illustrating operation of the vehicular engine control device.

More specifically, after time t33 shown in FIGS. 5F to 5J, if it is assumed that the output characteristic levels of the steering angle and steering torque are slightly below the third steering angle threshold OA_th3 and the third steering torque threshold OT_th3, respectively (see FIGS. 5G, 5H). That is, the output characteristic of the steering angle sensor 6 is blow the third steering angle threshold OA_th3. Similarly, the output characteristic of the steering torque sensor 5 is below the third steering torque threshold OT_th3. Accordingly, the control unit 39 of the vehicular engine control device 33 regards the state as no occurrence of driver's driving intention to start the own vehicle and makes a determination that the automatic engine restart control is inhibited.

Figure 5J:
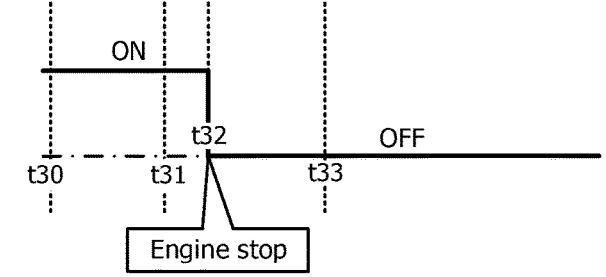
FIG. 5J is a time chart for illustrating operation of the vehicular engine control device.

As a result, after time t33, the automatic engine restart is inhibited based on that the steering angle or the steering torque are below the third steering angle threshold OA_th3 or the third steering torque threshold OT_th3, in addition to the state in which the vehicle is in the brake ON state and the accelerator OFF state, and the automatic engine restart is inhibited (see FIG. 5j).

Next, the automatic engine restart control operation related to the comparative example performed in such a scene that the steering wheel 1 is operated in the vehicle still being in the travelling state in the case where the automatic engine stop control is performed when the vehicle speed of the own vehicle is in the reduced speed range, is described below with reference to FIGS. 6A to 6E.

FIGS. 6A to 6E represent the output characteristic of the vehicle speed sensor 7, the output characteristic of the steering angle sensor 6, and the output characteristic of the steering torque sensor 5, the ON/OFF output characteristic of the brake sensor 8, and the ON/OFF output characteristic of the engine in time-base manner in such a scene that the steering wheel 1 of the own vehicle still in traveling state is operated.

A difference between the embodiment regarding FIGS. 5A to 5E and FIGS. 5F to 5J and the comparative example regarding FIGS. 6A to 6E is in that a fifth steering angle threshold OA_th5 and the fifth steering angle threshold OT_th5, which are able to be triggers for restart of the stopping engine during time t42 to t44 during which the vehicle speed of the own vehicle is in the reduced speed range, are set to levels which are able to be reached by the output characteristics of the steering angle or the steering torque.

In the comparative example shown in FIGS. 6A to 6E, at time t42, the engine of the own vehicle being traveling in the reduced speed range is automatically stopped on the basis of the fact that the steering angle or the steering torque is blow the steering threshold (first steering angle threshold OA_th1 or the first steering torque threshold OT_th1 (the fourth stop condition is fulfilled: see FIGS. 6B, 6C) in addition to the fact that the vehicle speed of the own vehicle is below the reduced speed (see FIG. 6A), and the vehicle is in the brake ON state and in the accelerator OFF state (the stop condition of tree rules is fulfilled).

Further, in the comparative example regarding FIGS. 6A to 6E, at time t43, the engine is automatically restarted (see FIG. 6E) on the basis of the fact that the steering angle or the steering torque exceeds the steering threshold (the fifth steering angle threshold OA_th5 or the fifth steering angle threshold OT_th5) though the vehicle is in the brake ON state (see FIG. 6D) and in the accelerator OFF state.

Figure 6A:
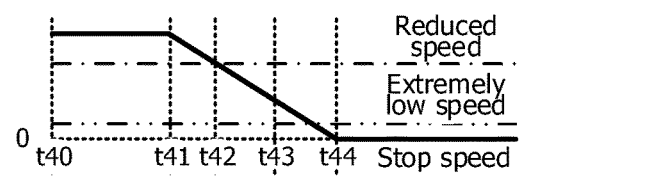
FIG. 6A is a time chart for illustrating operation of the vehicular engine control device of a comparative example.
Figure 6B:
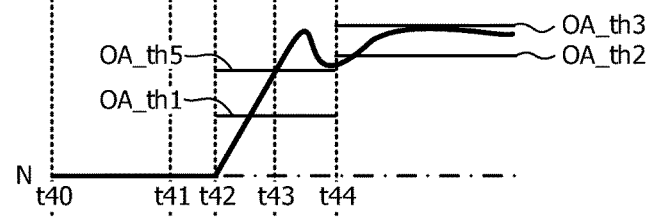
FIG. 6B is a time chart for illustrating operation of the vehicular engine control device of a comparative example.
Figure 6C:
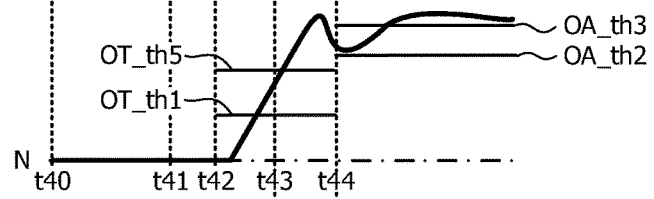
FIG. 6C is a time chart for illustrating operation of the vehicular engine control device of a comparative example.
Figure 6D:
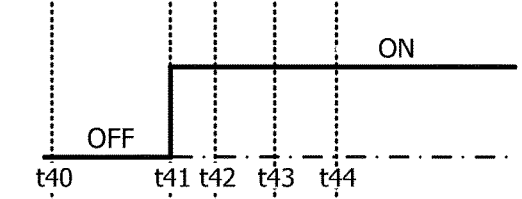
FIG. 6D is a time chart for illustrating operation of the vehicular engine control device of a comparative example.
Figure 6E:
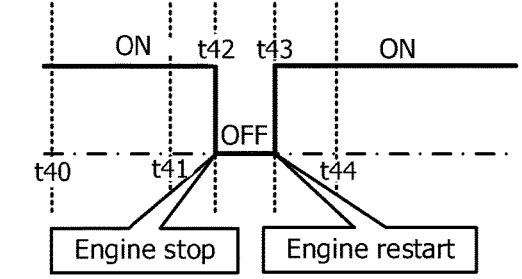
FIG. 6E is a time chart for illustrating operation of the vehicular engine control device of a comparative example.

As described above, for example, when the engine of the own vehicle being travelling in the engine stop state at timing such as time t43, this may invite a rapid change in the steering angle or the steering torque, which may cause the behavior of the own vehicle to be unstable, as shown by the output characteristics of the steering angle and the steering torque from time t43 to t44 (see FIGS. 6B, 6C).

In this regard, the vehicular engine control device 33 according to the embodiments of the present invention adopts such a configuration that the automatic engine restart control is inhibited when the automatic engine stop control is performed while the vehicle speed of the own vehicle is in the reduced speed range. In the vehicular engine control device 33 according to the embodiments of the present invention, such an advantageous effect can be expected that the behavior of the own vehicle is stabilized.

[Advantageous Effect Regarding the Automatic Engine Stop Control which the Vehicular Engine Control Device 33 According to the Embodiments of the Present Invention has]

Next, an advantageous effect regarding the automatic engine stop control which the vehicular engine control device 33 according to the embodiments of the present invention has.

In the vehicular engine control device 33 based on the first aspect adopted the following configuration:

The stop condition is set to include the vehicle speed information and the steering information acquired by the traveling information acquiring unit 35 including respective thresholds, and the control unit 39 switches the stop condition which is sectioned into a plurality of regions with the steering thresholds regarding the steering information of the steering wheel (steering member) 1 (first and second thresholds, and first and second steering torque threshold).

In the vehicular engine control device 33 based on the first aspect, the control unit 39 switches, in accordance with the change of the vehicle speed information, the stop condition which is sectioned into a plurality of regions with the steering thresholds regarding the steering information of the steering wheel 1 (first and second steering angle threshold and the first and second steering torque thresholds).

More specifically, for example, the control unit 39 of the vehicular engine control device 33 waits for the fulfillment of the stop condition (the vehicle speed of the own vehicle is not greater than the reduced speed (for example, 10 km/h, etc.) in the brake ON state and accelerator OFF state, and either of the steering angle or the steering torque of the steering wheel 1 is below the first steering angle threshold OA_th1 or the first steering torque threshold OT_th1) and performs the automatic stop control.

Regarding this, "switching, in accordance with the change of the vehicle speed information, the stop condition which is sectioned into a plurality of regions with the steering thresholds (first and second steering angle threshold and the first and second steering torque thresholds)" means that, for example, "when the vehicle speed of the own vehicle is in the reduced speed range, the stop condition is set using the second steering angle threshold OA_th2 as the steering threshold and the second steering torque threshold OT_th2. On the other hand, when the vehicle speed of the own vehicle is in the extremely low speed range (including the vehicle speed is zero), the stop condition is set using second steering angle threshold OA_th2 and second steering torque threshold OT_th2 as the steering threshold". This can be exemplified as an embodiment.

When the vehicle speed of the own vehicle is in the reduced speed range, it is preferable to inhibit the automatic engine stop control in such a scene that a driver's intention to make a right or left turn or a revolution occurs. As this scene, for example, such a scene that a right or left turn is made while the vehicle travels on an intersection at a reduced speed, a parking scene at a car park, etc can be assumed. This is because if the automatic engine stop control is permitted in such a scene, this may interfere with the operation for the right or left turn and parking operation, which are intended by the driver.

Accordingly, when the vehicle speed of the own vehicle is in the reduced speed range, as a determination reference to inhibit the automatic engine stop, the stop condition is set using small steering thresholds based on the straight traveling state (the first steering angle threshold OA_th1 and the first steering torque threshold OT_th1). Accordingly, such a configuration that the automatic engine stop control is inhibited when the steering angle or the steering torque exceeds the steering threshold (the first steering angle threshold OA_th1 or the first steering torque threshold OT_th1, i.e., the own vehicle is not in the straight traveling state, is adopted. In other words, such a configuration that, when the own vehicle is in the straight travelling state, the automatic engine stop control is permitted, is adopted.

On the other hand, when the vehicle speed of the own vehicle is in the extremely low speed range (including a stop state), in contrast to the above-described case, it is preferable to permit the automatic engine stop control in such a scene that the driver's intention to make a right or left turn or a revolution occurs. As this scene, for example, it is possible to assume that there is a scene where a wait for light to change is made in such a state that stationary-steering is made toward a right or left turn direction. This is because if the automatic engine stop control is inhibited in such a scene, there may be a possibility that such a desired object to save fuel or reduction in emission cannot be achieved sufficiently.

Accordingly, when the vehicle speed of the own vehicle is in the extremely low speed range, as a determination reference to inhibit the automatic engine stop, the stop condition is set using larger steering thresholds than the above-described case (when the vehicle speed of the own vehicle is in the reduced speed) (the second steering angle threshold OA_th2 and the second steering torque threshold OT_th2). Accordingly, such a configuration that the automatic engine stop control is inhibited when the steering angle or the steering torque exceeds the steering threshold (the second steering angle threshold OA_th2 or the second steering torque threshold OT_th2, i.e., the steering wheel 1 of the own vehicle is largely turned, is adopted. More specifically, because the range in which the steering wheel 1 is not operated is expanded, this makes it easy to fulfill the stop condition, so that the automatic engine stop can be rapidly made.

According to the vehicular engine control device 33 based on the first aspect, the automatic engine stop control according to the driver's intention can be provided.

Further, in the vehicular engine control device 33 based on the second aspect, the following configuration may be adopted:

The steering threshold (the second steering angle threshold and the second steering torque threshold) regarding the steering quantity of the steering wheel (steering member) 1 as the stop condition used when the vehicle speed of the own vehicle is in the extremely slow region where the vehicle speed of the own vehicle is smaller than the low speed, is set to be greater than the steering threshold regarding the steering wheel 1 as the stop condition used when the vehicle speed is in the reduced speed which is not smaller than the low speed of the vehicle speed of the own vehicle.

In the vehicular engine control device 33 based on the second aspect, the following configuration is adopted:

Execution timing for the automatic engine stop control is delayed when the vehicle speed of the own vehicle is at the extremely low speed range by setting the steering threshold regarding the steering wheel (steering member) 1 to be greater than that when the vehicle speed of the own vehicle is in the reduced speed range.

More specifically, such a scene is assumed that, for example, when the vehicle speed of the own vehicle is in the extremely slow range, waiting for the light to change is made at an intersection in such a state that the steering wheel 1 is stationary-steered in a direction for right or left turn. The steering amount of the steering wheel (steering member) 1 in such a scene is frequently larger than the steering quantity when the vehicle speed of the own vehicle is in the reduced speed range.

If so, if the steering threshold used when the vehicle speed of the own vehicle is in the extremely low speed range is set to have the same value as the steering threshold used when the vehicle speed of the own vehicle, it is impossible to acquire a delicate driver's intention appropriately.

Further, when the vehicle speed of the own vehicle is in the reduced speed range and if the own vehicle is being operated to be parked, it is not preferable that the engine is automatically stopped.

Accordingly, in the vehicular engine control device 33 based on the second aspect, the following configuration is adopted:

The steering threshold (second steering threshold and the second steering torque threshold) as the stop condition used when the vehicle speed of the own vehicle is set to be greater than the steering threshold (first steering angle threshold and the first steering torque threshold) for the operating quantity of the steering wheel (steering member) 1 as the stop condition used when the vehicle speed of the own vehicle is in the reduced speed range.

According to the vehicular engine control device 33 based on the second aspect, the fine driver's driving intention according to the scene change is appropriately drawn such that, for example, when the own vehicle is operated for parking, it is previously avoided to automatically stop the engine. This can be applied to the automatic engine stop control.

In the vehicular engine control device 33 based on the third aspect, as the steering quantity of the steering member, the steering angle of the steering wheel (steering member) 1 may be adopted.

In the vehicular engine control device 33 based on the fourth aspect, the steering torque of the steering wheel (steering member) 1 maybe adopted as the steering quantity of the steering member.

[Advantageous Effect Regarding the Automatic Engine Restart Control which the Vehicular Engine Control Device 33 According to the Embodiment of the Present Invention has]

Next, an advantageous effect regarding the automatic engine restart control which the vehicular engine control device 33 according to the embodiments of the present invention has is described below.

In the vehicular engine control device 33 based on the fifth aspect, the stop condition, which serves as a trigger for automatically stop the engine, is set such that the vehicle information acquired by at least the traveling information acquiring unit 35 includes the threshold. The restart condition, which serves as a trigger for automatically restarting the engine, is set such that the operation information of the steering wheel (steering member) 1, which is acquired by at least the voltage information acquiring unit 37, includes the threshold.

When the vehicle speed of the own vehicle is in the extremely low speed range where the vehicle speed of the own vehicle is regarded as stop of the own vehicle, the control unit 39 permits fulfillment of the restart condition based on the operation information of the steering wheel 1 (steering member). On the other hand, the control unit 39 inhibits fulfillment of the restart condition based on the operation information of the steering wheel (steering member) 1 when the vehicle speed of the own vehicle is greater than the extremely low speed (low vehicle speed).

At this instance, when the engine is restarted, a large power is required instantaneously by cranking. When a large power consumption is required, the power supply to the assist motor 16 for supplying steering assist power is supplied to there.

As a result, this provides the driver's hands on the steering wheel 1 unnatural feeling due to variation in the steering assist force. Then, the control unit 39 of the vehicular engine control device 33 tries to suppress the unnatural feeling due to the variation in the steering assist force by inhibiting fulfillment of the restart condition, though the braking operation is released.

In the vehicular engine control device 33 based on the fifth aspect, when the vehicle speed of the own vehicle fulfills the stop condition when the vehicle speed of is in the reduced speed range, which is not smaller than the extremely low speed (low vehicle speed), the control unit 39 inhibits the fulfillment of the restart condition based on the operation information of the steering wheel (steering member) 1. As a result, the restart of the engine does not occur during operation of the steering wheel (steering member) 1. As a result, this can suppress a power supply voltage drop phenomenon (variation in the assist force for steering), which tends to occur at the restart of the engine.

According to the vehicular engine control device 33 based on the fifth aspect, the restart control for the engine can be provided with a favorable operation feeling.

Further, the following configuration may be adopted:

In the vehicular engine control device 33 based on the sixth aspect, the control unit 39 instructs the EPS control device 31 to limit an assist steering force relative to the assist string force during running of the engine by the assist motor 16 for controlling driving the assist motor 16 generating an assist steering force for assisting the operation force of the steering wheel (steering member) 1 by the driver.

According to the vehicular engine control device 33 based on the sixth aspect, the control unit 39 can suppress a power consumption by the assist motor 16 relative to the power consumption during driving of the engine because the control unit 39 instructs the power steering control device 31 to limit an assist steering force relative to the assist steering force during running of the engine by the assist motor 16 for controlling driving the assist motor 16 generating an assist steering force for assisting the operation force of the steering wheel (steering member) 1 by the driver. As a result, when the restart request is generated because of fulfillment of the restart condition, the power necessary for restart can be easily acquired. This provides smooth restart of the engine.

Further, in the vehicular engine control device 33 based on the seventh aspect, the following configuration may be adopted: A voltage information acquiring unit 37 is provided for acquiring a voltage of the in-vehicle battery (storage battery) 25 installed on the own vehicle for supplying power to at least the vehicular engine control device 33 and the EPS control device 31. When the voltage of the in-vehicle battery (storage battery) 25 acquired by the voltage information acquiring unit 37 during the engine stop is below a predetermined voltage threshed, the control unit 39 regarded this state as fulfillment of the restart condition and restarts the engine.

According to the vehicular engine control device 33 based on the seventh aspect, a low voltage of the in-vehicle battery (storage battery) 25 due to the start of the engine can be eliminated because the engine is restarted when the voltage of the in-vehicle battery 25 is below the preset voltage threshold during the engine stop.

Other Embodiments

A plurality of the embodiments described above are only examples of the present invention. Accordingly, it should be avoided that a technical scope of the invention is limitedly interpreted. The present invention can be embodied in various modes without departure from the main feature.

For example, in the description about the vehicular engine control device 33 according to the embodiment of the present invention, the controlling unit 36 of the EPS control device 31 has the function of generating the control signals for performing or inhibiting the automatic engine stop and the function of generating control signal for performing or inhibiting the engine restart. The present invention is not limited to this example.

The present invention may adopt the following configuration:

In place of the controlling unit 36 of the EPS control device device 31 the control unit 39 of the vehicular engine control device 33 has a function of generating the control signal for permitting or inhibiting the automatic engine stop and the function of generating the control signal for performing or inhibiting the engine restart. In this case, the vehicular engine control device 33 corresponds to "vehicular engine control device" according to the present invention.

DESCRIPTION OF REFERENCE SYMBOLS 1 steering wheel (steering member)
33 vehicular engine control device
34 travelling information acquiring unit
35 traveling information acquiring unit
36 controlling unit
39 control unit

The invention claimed is:

1. A vehicular engine control device comprising:
   a control unit which performs a control of stopping an engine installed on a vehicle in accordance with comparison between the vehicle speed information and a vehicle speed information threshold and comparison between the steering information and steering information stopping thresholds and a control of restarting the engine in accordance with the comparison between the vehicle speed information and vehicle speed information threshold, a comparison between the steering information and a steering information restarting threshold, a state of the brake, and a state of an accelerator;
   a travelling information acquiring unit acquiring travelling information including vehicle speed information of a speed of the vehicle and steering information of a steering member of the vehicle, wherein
   the control unit:
      switchably uses one of the steering information stopping thresholds in accordance with the vehicle speed information detected by the travelling information acquiring unit;
      performs the control of restarting the engine when the steering information exceeds a first steering information restart threshold in a case where the vehicle speed information is smaller than a low vehicle speed which is regarded as a vehicle speed at which the vehicle is stopping; and
      inhibits, in a case where the vehicle speed information is not smaller than the low vehicle speed, the control of restarting the engine when the steering information exceeds a second steering information restart threshold which is larger than the first steering information restart threshold.

2. The vehicular engine control device as claimed in claim 1, wherein the travelling information acquiring unit acquires a steering quantity of the steering member as the steering information of the steering member; wherein
   the vehicle speed information threshold is sectioned into a plurality of regions including at least the low vehicle speed which is regarded as the vehicle speed when the vehicle is stopping and a reduced speed in which the vehicle speed is greater than the low vehicle speed of the vehicle; wherein
   the control unit selectively uses one of the regions in accordance with variation in the vehicle speed information; wherein
   the steering information stopping thresholds include a first steering information stopping threshold for the steering quantity of the steering member when the vehicle speed of the vehicle is in the low speed a second steering information stopping threshold for the steering quantity of the steering member when the vehicle speed is in the reduce speed; and wherein
   the first steering information stopping threshold is set to be greater than the second steering information stopping threshold.

3. The vehicular engine control device as claimed in claim 1, wherein as the steering quantity of the steering member, a steering angle of the steering member is used.

4. The vehicular engine control device as claimed in claim 1, wherein as the steering quantity of the steering member, a steering torque of the steering member is used.

5. The vehicular engine control device as claimed in claim 1, the control unit permits the control of restarting the engine when the state of the brake is off and the state of the accelerator is on when the vehicle speed information is not smaller than the low vehicle speed.

* * * * *